United States Patent [19]
Brady

[11] Patent Number: 6,062,130
[45] Date of Patent: May 16, 2000

[54] CONVERTIBLE HOUSEHOLD ELECTRIC COOKING APPLIANCE

[75] Inventor: Martin Brady, Chesterfield, Va.

[73] Assignee: Hamilton Beach/Proctor-Silex, Inc., Glen Allen, Va.

[21] Appl. No.: 09/286,539

[22] Filed: Apr. 5, 1999

[51] Int. Cl.⁷ .............................. A47J 37/00; A47J 37/06; A47J 37/10; H05B 3/06

[52] U.S. Cl. ................................ 99/332; 99/375; 99/376; 99/378; 99/400; 99/424; 99/446; 219/386; 219/474; 219/521; 219/525; 219/533

[58] Field of Search .............................. 99/326, 331–333, 99/339, 340, 372–384, 389, 426, 400, 401, 422–425, 446–450, 444, 445; 219/474, 472, 533, 477, 386, 521–532, 536, 506, 535, 460–463; 426/523

[56] References Cited

U.S. PATENT DOCUMENTS

| | | |
|---|---|---|
| 1,697,384 | 1/1929 | Coutu . |
| 1,929,166 | 10/1933 | Freemon . |
| 2,157,303 | 5/1939 | Penrose et al. . |
| 2,321,676 | 6/1943 | Hennessy ................................ 99/425 |
| 2,632,379 | 3/1953 | Kudo . |
| 3,010,383 | 11/1961 | Greene . |
| 3,245,337 | 4/1966 | White et al. . |
| 3,308,747 | 3/1967 | Spagnolo . |
| 3,369,481 | 2/1968 | Pappas ................................ 99/445 |
| 3,466,998 | 9/1969 | Musgrove . |
| 3,593,648 | 7/1971 | Walters ................................ 99/349 |
| 3,664,256 | 5/1972 | Peirce ................................ 99/425 |
| 3,719,507 | 3/1973 | Bardeau ................................ 99/375 |
| 3,842,726 | 10/1974 | Fautz ................................ 99/445 X |
| 3,848,110 | 11/1974 | Giguere et al. . |
| 3,938,431 | 2/1976 | Potvin . |
| 4,034,663 | 7/1977 | Jenn et al. ................................ 99/446 |
| 4,403,540 | 9/1983 | Erkelenz ................................ 99/375 |
| 4,972,766 | 11/1990 | Anetsberger ................................ 99/379 X |
| 5,363,748 | 11/1994 | Boehm et al. . |
| 5,606,905 | 3/1997 | Boehm et al. ................................ 99/400 X |
| 5,615,604 | 4/1997 | Chenglin . |
| 5,845,562 | 12/1998 | Deni et al. . |
| 5,848,567 | 12/1998 | Chiang . |

FOREIGN PATENT DOCUMENTS

| | | |
|---|---|---|
| 2051990 | 9/1991 | Canada . |
| 2212713 | 8/1989 | United Kingdom . |

*Primary Examiner*—Timothy Simone
*Attorney, Agent, or Firm*—Roger S. Dybvig

[57] ABSTRACT

A cooking appliance having an upper cooking unit pivotally mounted on a lower cooking unit for rotation substantially about a horizontal axis into three different positions, a first position in which the upper cooking unit is on top of the lower cooking unit to form a contact grill, a second position in which the upper cooking unit is substantially horizontally oriented with and parallel to the lower cooking unit to form therewith a double grooved griddle, and a third, generally upright, position intermediate the first and second positions to provide access to the lower cooking plate when the appliance is being used as a contact grill. The cooking plates have elongate grooves which are generally parallel to an axis of the hinge that connects the upper and lower cooking units together and which grooves increase in depth from one side of the cooking appliance to the other for carrying liquid cooking byproducts away from the food being cooked. The lower cooking plate is supported in a horizontal orientation and has liquid outlet surface portions which direct the liquid cooking byproducts to a collection tray removably located below the liquid outlet surface portions. The collection tray is located on one side of the lower cooking unit and a timer and a "power on" light are mounted on the front of the lower cooking unit in a position which does not interfere with the use of the tray.

17 Claims, 4 Drawing Sheets

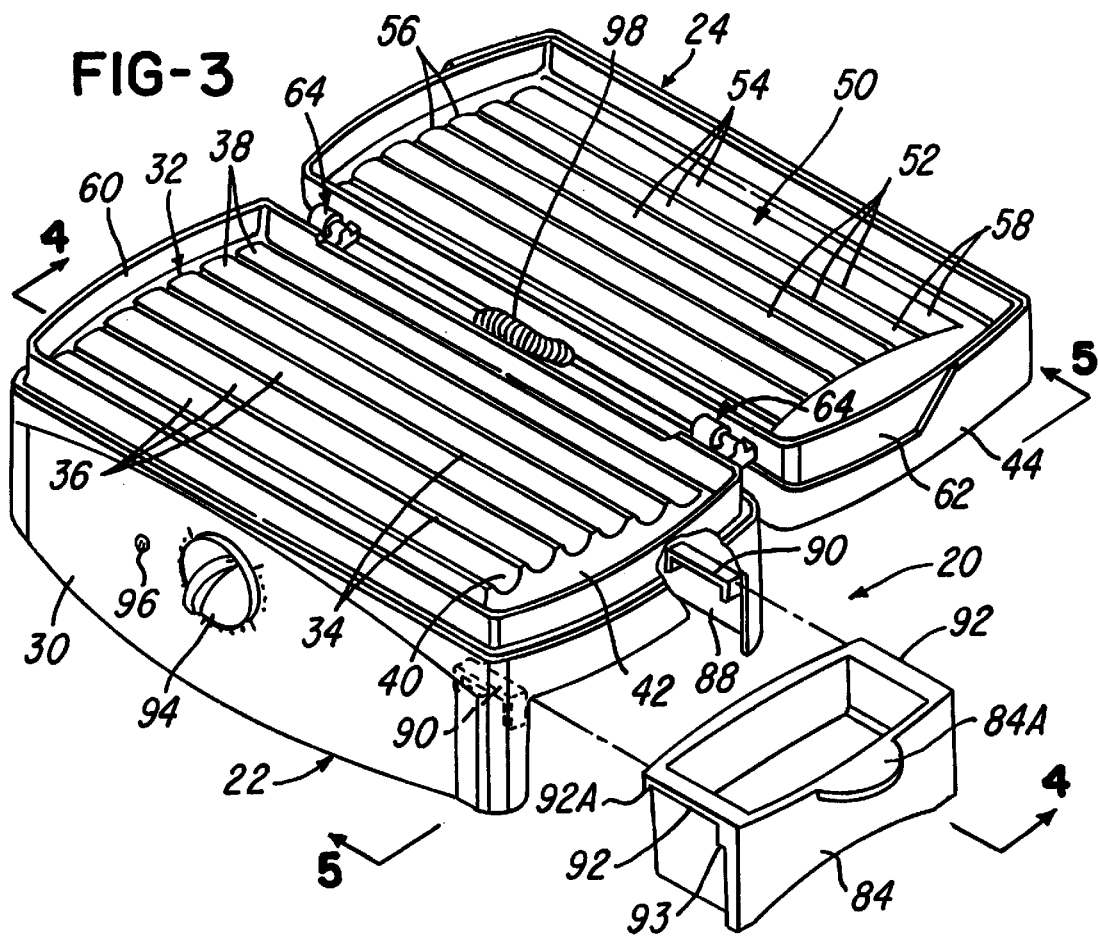
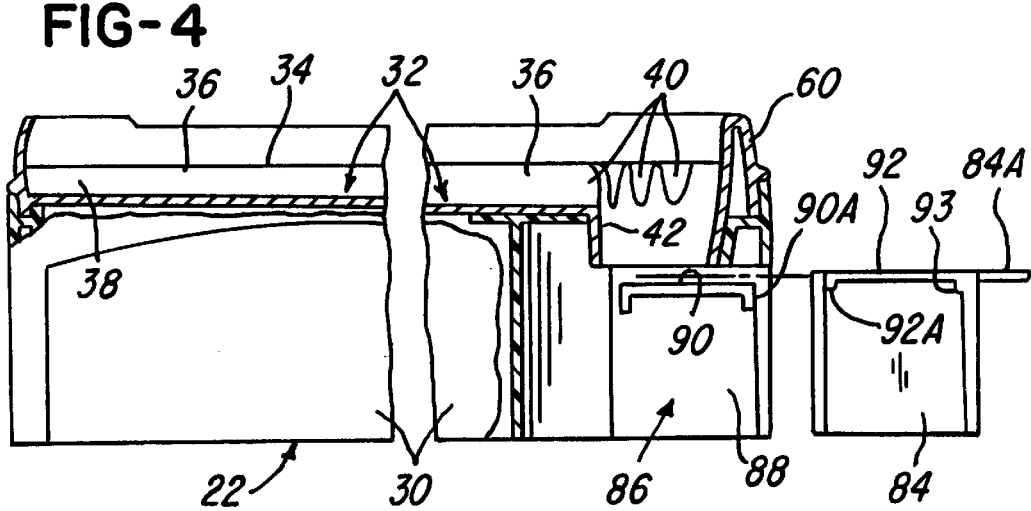

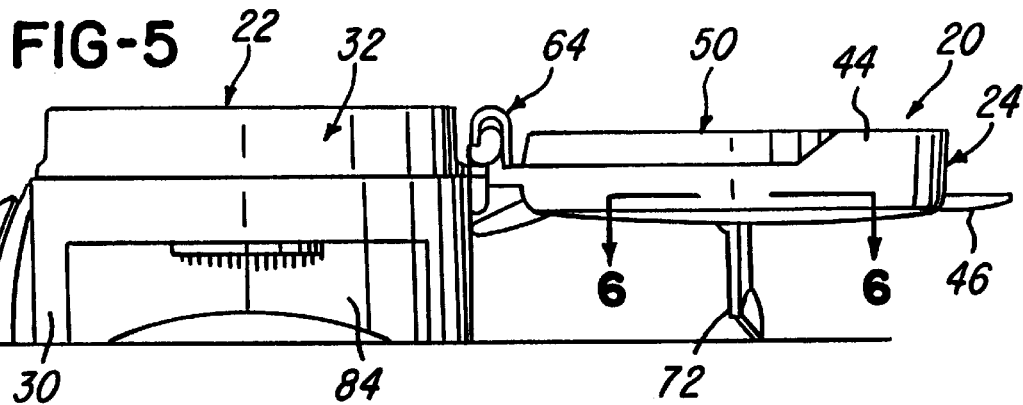
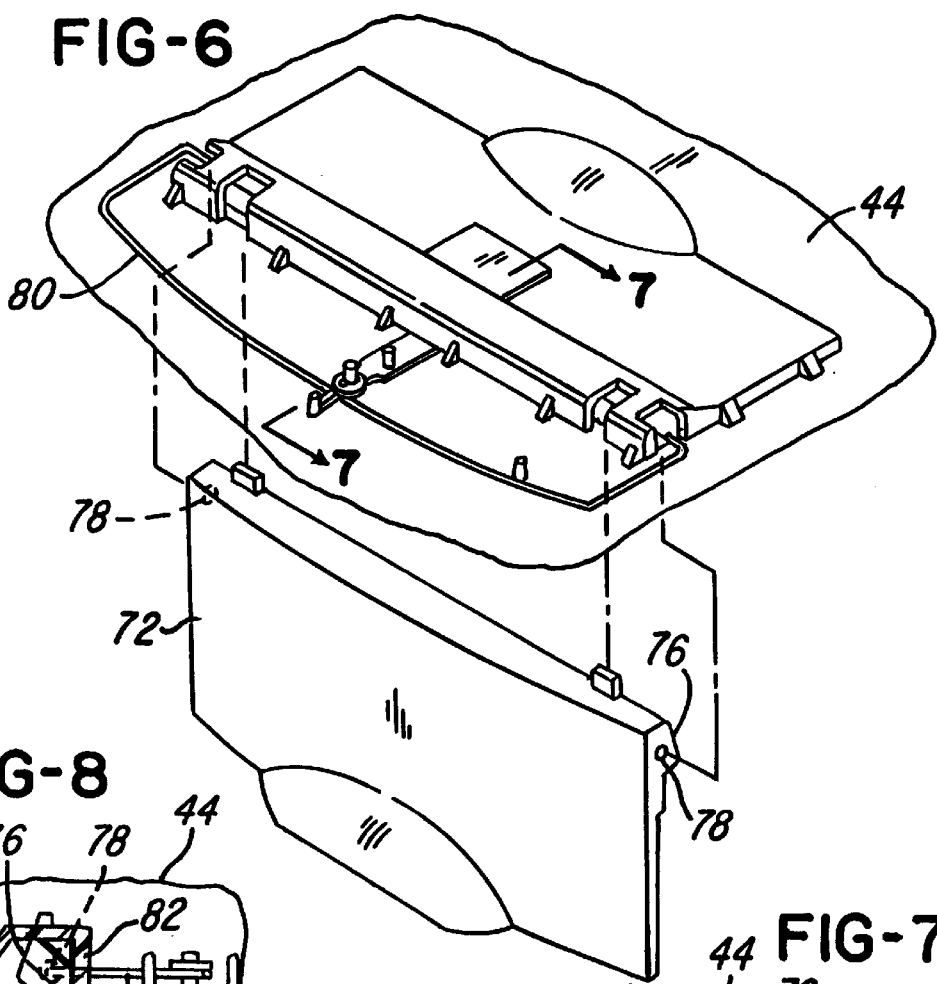
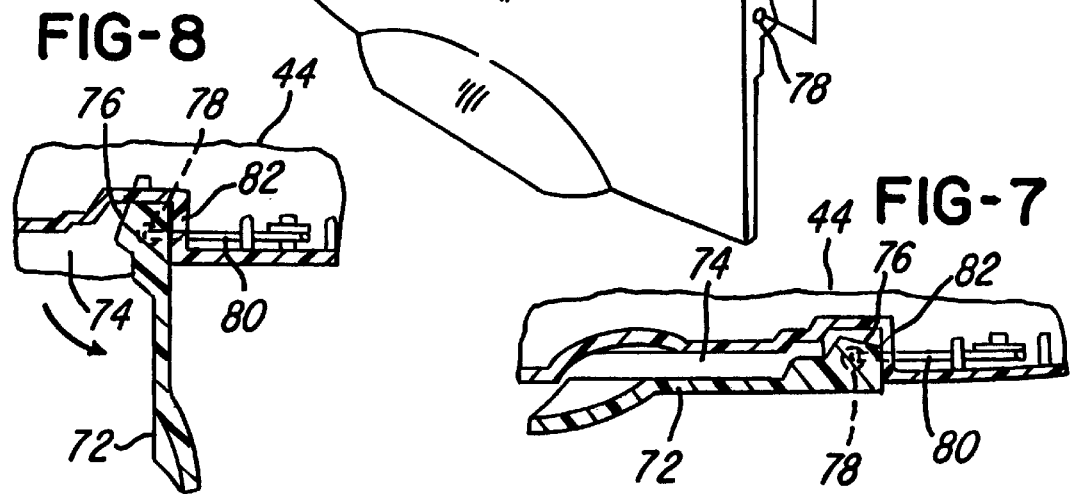

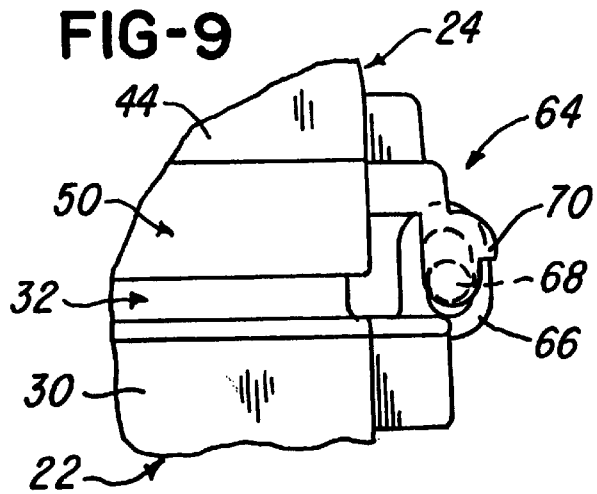
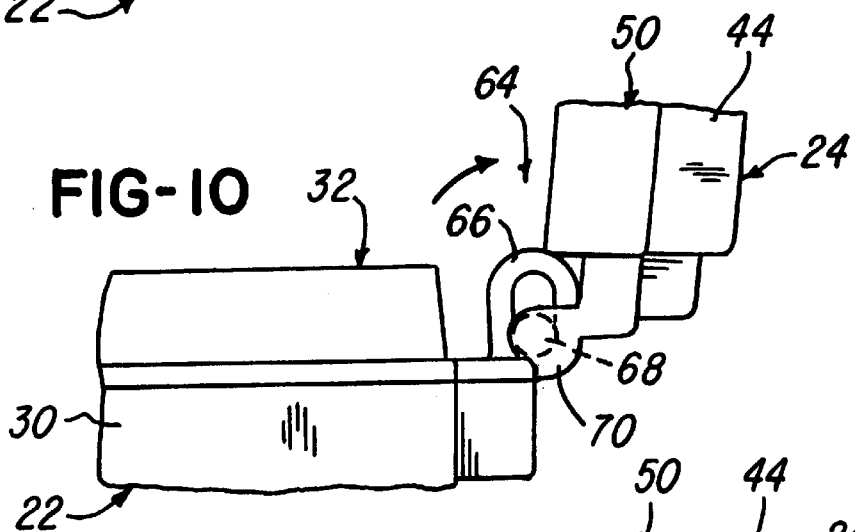
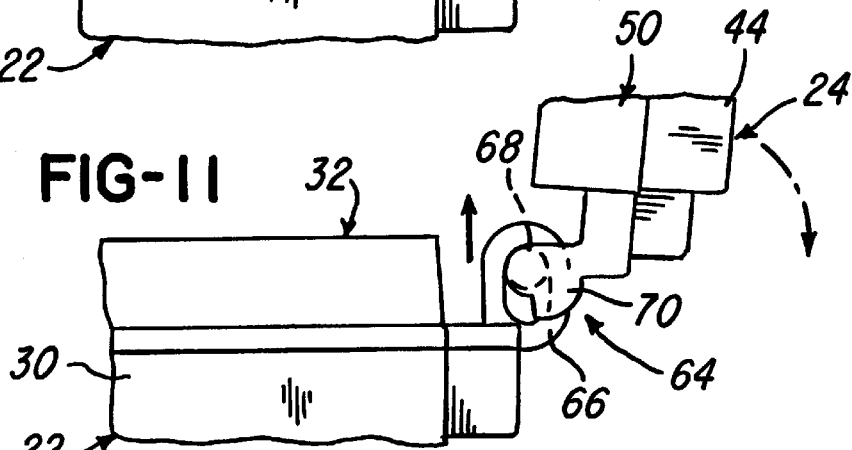
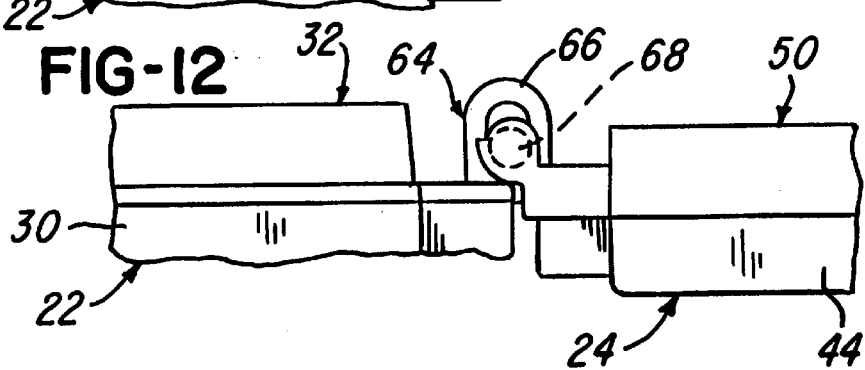

CONVERTIBLE HOUSEHOLD ELECTRIC COOKING APPLIANCE

FIELD OF THE INVENTION

The present invention relates to a convertible household electric cooking appliance intended for indoor use and more particularly to a household electric cooking appliance which may be used as a clamshell or contact grill having heated upper and lower cooking plates that cooperate to form a cooking chamber between them for rapidly cooking the foods or may be used as a double, grooved griddle having two upwardly-facing electrically-heated plates.

BACKGROUND OF THE INVENTION

Indoor electric contact grills have grown substantially in popularity among the consuming public and many models are commercially available through retail outlets. There is a continuing need to provide electric household grills which are attractive, safe, and convenient to use. Household contact grills have a lower housing with feet or pads for supporting the grill on a counter top and an upper housing pivotally mounted for rotation about a horizontal pivot axis on the upper housing. The lower and upper housing support respective upper and lower grill plates. The lower cooking plate usually has surfaces that slope downwardly away from a proximal location near the pivot axis to a distal location which is considered to be at the front of the grill. Accordingly, liquids, fats and small food particles that are byproducts (herein after called "liquid cooking byproducts") of the cooking process slide or flow down the sloping surfaces of the lower cooking plate to a collection vessel at the front of the grill, which may constitute a recess formed in the lower grill plate or may be separate from the lower grill plate. A common practice for household contact grills is to provide a liquid byproduct outlet at the front of the grill and a collection tray is placed by the user underneath the liquid outlet. Such an arrangement is not altogether desirable because of the greater depth of counter space required for the grill and the collection tray and because the tray is positioned such that the user can easily accidentally bump against the tray.

Typical household electric contact grills have calrod heaters for the grill plates that are preset to a single operating temperature and a timer that times the operation of the grill. The timers are usually spring-operated timers that are adjusted by the user to sound a signal after an adjusted period of time has elapsed. For the convenience of the user, the timer is preferably located at the front of the grill.

Most household electric contact grills are suited only for use as a contact grill. The prior art also includes so-called grooved griddles or hot plates that have only an upwardly-facing grill plate. In this day and age, the number of electric kitchen appliances available for use has placed kitchen counter and storage spaces at a premium. An appliance that could serve two different functions, namely a contact grill and a grooved griddle, could provide substantial advantages in cost and storage space relative to appliances that can perform only one function.

SUMMARY OF THE INVENTION

An object of the present invention is to provide an improved household cooking appliance. More specifically, an object of this invention is to provide an improved household electric grooved griddle. Yet another object of this invention is to provide an improved household electric contact grill. A related object is to provide a convertible household electric cooking appliance which can be used as a grooved griddle or as a contact grill.

In accordance with the foregoing objects, the present invention provides a convertible household electric cooking appliance comprising a lower cooking unit and an upper cooking unit pivotally mounted on the lower cooking unit for rotation substantially about a horizontal axis into three different positions, a first position in which the upper cooking unit is on top of the lower cooking unit, a second position in which the upper cooking unit is substantially horizontally oriented with and parallel to the lower cooking unit, and a third, generally upright, position intermediate the first and second positions. Both the upper and the lower cooking units have heated cooking plates which are substantially mutually coextensive and form a cooking chamber between them when the upper cooking unit is on top of the lower cooking unit. When the cooking appliance is so organized, it forms a contact grill. When the upper cooking unit is pivoted to a position beside the lower cooking unit, the cooking appliance is organized to provide a pair of grooved griddles or a "double griddle." When used as a double griddle, the cooking appliance of this invention naturally provides a larger cooking surface area than when used as a contact grill.

Preferably, the upper cooking unit, when used as part of a double griddle, has a support leg which supports the upper cooking unit so that its cooking plate is substantially coplanar with the lower cooking plate. The support leg is preferably pivotally mounted on the cover of the upper cooking unit and can be pivoted to an out of the way position, nearly flush with the upper cooking unit cover, when not in use.

When the cooking appliance of this invention is used as a contact grill, liquid cooking byproducts are guided away from the food being cooked by sloping surfaces on the lower cooking plate onto liquid outlet surface portions of the lower plate which direct the liquid cooking byproducts into a collection tray located below the liquid outlet surface portions.

The lower cooking plate of this invention is preferably mounted in a horizontal orientation and has a horizontal upper surface and sloping surfaces formed by elongate grooves of increasing depth from one end thereof the other. Because of this construction, the horizontal upper surface of the lower grill plate is divided into a plurality of elongate ribs having horizontal, mutually coplanar upper surfaces that support the food being cooked. Because the food rests on the horizontal upper surfaces of the ribs, food being cooked on the lower cooking plate has no tendency to slide along the downwardly-sloping surfaces.

Further in accordance with this invention, the grooves in the cooking plates are preferably generally parallel to a horizontal axis about which the upper cooking unit pivots relative to the lower cooking unit. The parts are organized so that the collection tray is located on one side of the lower cooking unit and a timer and a "power on" light can conveniently be mounted on the front of the lower cooking unit without interfering with the use of the tray.

Preferably, the upper cooking plate is, when in use, horizontally supported and has plural, elongate, food-supporting ribs with mutually coplanar food-engaging surfaces separated by arcuate troughs that increase in depth from one side of the cooking plate to the other. The ribs and troughs are also parallel to an axis of rotation of the upper cooking unit relative to the lower cooking unit. When used as a griddle member, liquid cooking byproducts are guided by the grooves away from the food being cooked and accumulate at the deeper ends of the grooves.

In another aspect of this invention, an object is to provide an improved cooking unit for a household electric cooking appliance. In accordance with this aspect of the invention, a cooking unit, which itself may form a household griddle appliance or which may be connected to another cooking unit to form a contact grill, has a cooking plate with sloping surfaces for directing liquid cooking byproducts away from the cooking area to liquid outlet surface portions on the cooking plate and over the outlet surface portions into a collection tray removably mounted on the cooking unit.

Other arrangements are possible, but the collection tray is preferably mounted in a cavity located in the same support as the cooking plate. The cavity is defined in part by a pair of vertical wall portions spaced apart from one another in a parallel manner and extending in the same direction as the grooves. A pair of coplanar, upwardly-facing tray-supporting surfaces project toward one another from respective ones of the vertical wall portions. The collection tray has two lateral side flanges removably and slidably retained on the tray-supporting surfaces.

The foregoing and other objects and advantages of this invention will become apparent from the following description and accompanying drawings.

BRIEF DESCRIPTION OF THE DRAWINGS

FIG. 3 is a partly exploded, perspective view, with parts broken away to show internal detail, of the appliance shown organized to operate as a griddle.

FIG. 4 is a cross-sectional view of the appliance taken along line 4—4 of FIG. 3.

FIG. 5 is a side elevational view of the appliance viewed in the direction of arrows 5—5 of FIG. 3.

FIG. 6 is a fragmentary, exploded perspective view of the appliance in the area thereof generally indicated by arrows 6—6 of FIG. 5 and illustrates the mounting of a leg on the cover of the upper cooking unit in accordance with this invention.

FIG. 7 is a fragmentary cross-sectional view of the appliance taken along line 7—7 of FIG. 6.

FIG. 8 is a view similar to FIG. 7 but showing the leg in a different position of operation.

FIG. 9 is a fragmentary side elevational view of a hinge that may be used to pivotally connect the upper and lower cooking units together.

FIGS. 10, 11 and 12 are views similar to FIG. 10 that illustrate the operation of the hinge.

DETAILED DESCRIPTION

Figure 1:
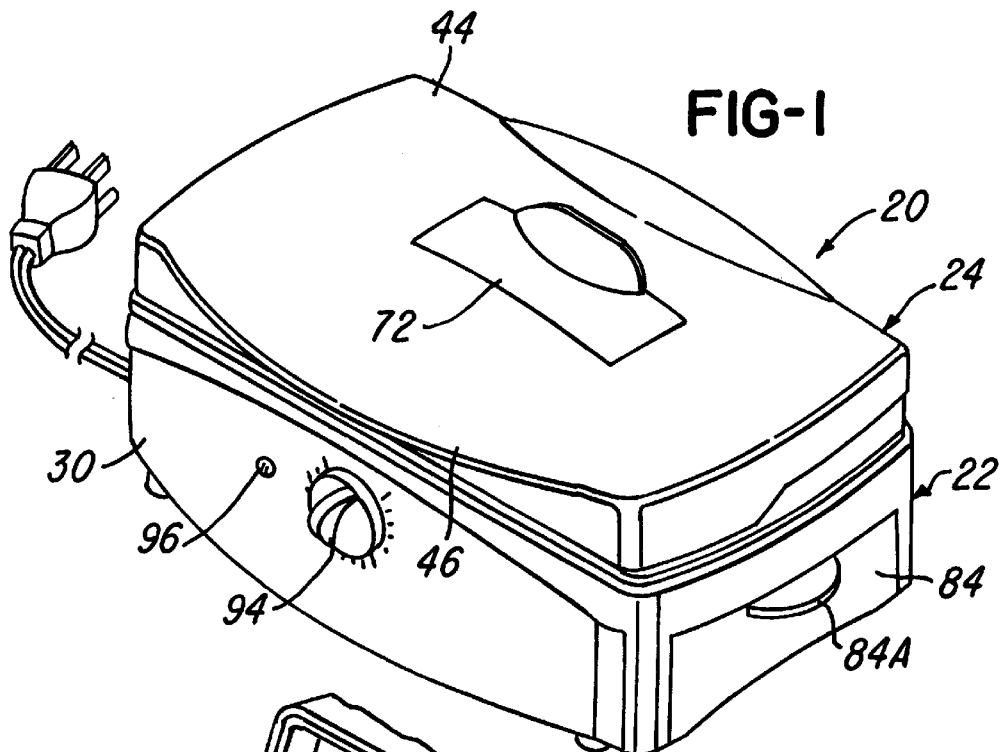
FIG. 1 is a fragmentary, perspective view of a convertible household electric cooking appliance in accordance with this invention shown in a closed, storage condition.
Figure 2:
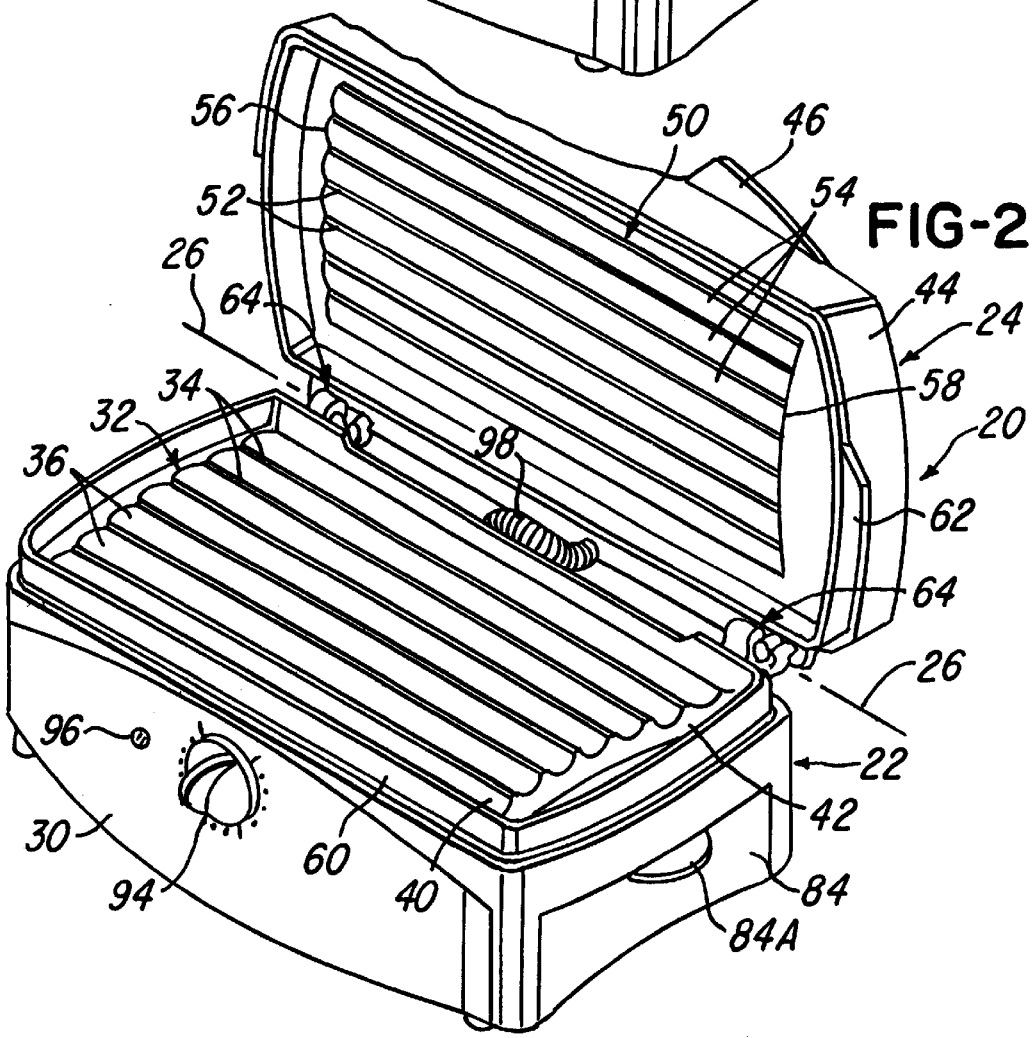
FIG. 2 is a fragmentary, perspective view of the appliance of FIG. 1 shown opened to receive foods to be cooked.

Referring to FIGS. 1, 2 and 3, a convertible household electric cooking appliance in accordance with this invention is generally designated 20 and comprises a lower cooking unit 22, an upper cooking unit 24 pivotally mounted on the lower cooking unit 22 for rotation substantially about a horizontal axis 26 into three different positions, a first position shown in FIG. 1 in which the upper cooking unit 24 is on top of the lower cooking unit 22, a second position shown in FIG. 3 in which the upper cooking unit 24 is substantially horizontally oriented with and parallel to the lower cooking unit 22, and a third, generally upright, position illustrated in FIG. 2 intermediate the first position of FIG. 1 and the second position of FIG. 2.

With reference also to FIG. 4, the lower cooking unit 22 includes a support or support housing 30 that supports a lower cooking plate 32 mounted by the support 30 in a horizontal orientation. Lower cooking plate 32 can be made from a suitable aluminum alloy or other metal and is preferably coated with a Whitford or other non-stick coating and is electrically heated, as conventional, by a calrod or other heating element (not shown). As shown in FIGS. 2, 3, and 4, the lower cooking plate 32 has an upwardly-facing, upper surface formed from plural, mutually parallel and coplanar cooking surfaces 34 separated from one another by plural, mutually-parallel arcuate drainage grooves 36 that increase in depth from adjacent one side margin 38 (at the left as viewed FIG. 4) of the lower cooking plate 32 toward the opposite side margin 40 (at the right as viewed in FIG. 4) of the lower cooking plate 32. In addition, the lower cooking plate 32 has liquid outlet surface portions 42 adjacent the opposite or right side margin 40 that permit liquid cooking byproducts, such as fats, oils and other residues of the cooking process, to move down the drainage grooves 36 to drip downwardly off the lower cooking plate 32.

Referring now to FIGS. 1, 2, 3 and 5, the upper cooking unit 24 comprises an upper housing or cover 44 having a forwardly projecting handle 46. Upper cooking unit 24 additionally includes an upper cooking plate 50 affixed, as by screws (not shown) to the cover 44. Upper cooking plate 50 is also heated by a conventional calrod or other heating element and is preferably coated with a Whitford or other non-stick coating. Also, the upper cooking plate 50 has plural, mutually planar cooking surfaces 52 separated by grooves 54 which slope from a lesser depth near the left side margin, designated 56, of the upper cooking unit 24 to a greater depth near the right side margin, designated 58, of the upper cooking unit 24. The upper cooking unit 24 can be placed over the lower cooking unit 22 as shown in FIG. 1 to form a cooking chamber (not shown) between the two cooking plates 32 and 50. Here it may be noted that the lower cooking plate 32 and the upper cooking plate 50 are substantially coextensive in size and shape and have interfitting upstanding perimeter walls 60 and 62, respectively, which confine the cooking chamber.

The pivotal connection between the lower cooking unit 22 and the upper cooking unit 24 can take any of various forms. A presently preferred connection comprises a hinge, generally designated 64, which pivotally connects the back side of the upper cooking plate 50 to the back side of the lower cooking plate 32. With reference to FIGS. 2, 3 and 9 through 12, the hinge 64 comprises a pair of vertically elongated bearing members 66 affixed to the lower cooking plate 32 at respective opposite ends of the back margin thereof and a pair of hinge pins 68 located within the bearing members 66. As is evident from a comparison of FIGS. 9 through 12, a user of the appliance 20 can pivot the upper cooking unit 24 in a clockwise direction from its position shown in FIGS. 1 and 9 to its position shown in FIGS. 3 and 12, by pulling upwardly on the upper cover handle 46 to pivot the upper cooking unit 24 into the intermediate or upright position illustrated in FIGS. 2 and 10. Further clockwise pivotal movement of the upper cooking unit 24 is prevented by the engagement of a stop lug 70 at the back of the upper cooking plate 50 with the back edge of the lower cooking plate 32. The user can then lift the upper cooking unit 24 upwardly so that the hinge pins 68 are moved upwardly within the bearing 66 to move the stop lug 70 away from the lower cooking plate 32, thus allowing the user to continue pivoting the upper cooking unit 24 in a clockwise direction until it reaches the position shown in FIGS. 3 and 12, at which time the upper cooking plate 50 faces upwardly.

Preferably, the two cooking plates 32 and 50 are both horizontal and mutually coplanar when the cooking units 22 and 24 are side-by-side one another as shown in FIG. 3 so that both may be used to form a double grooved griddle. To avoid an unduly bulky and heavy construction, the upper cooking unit 24 has a lesser height than the lower cooking unit 22. To position the two cooking plates 32 and 50 at the same elevation, the upper cooking unit 24 has a vertically-extending support leg 72 which cooperates with the hinge 64 to support the upper cooking unit 24 when it is used as a griddle. With reference to FIGS. 1 and 5 through 8, the support leg 72, when not in use, is unobtrusively located within a recess 74 located centrally in the upper housing cover 44. Leg 72 has a pivot rod 76 which is generally rectangular in cross section and which has bores 78 at each end that receive the ends of a spring wire 80 trapped against the underside of the upper cover 44. In either end position of the leg 72, i.e., in the recess 74 or projecting outwardly to serve as a support, the spring wire 80 biases the pivot rod 76 against a vertical wall 82 integral with the upper cover 44 so that the leg 72 is biased by the spring wire 80 to remain in both end positions.

With reference to FIGS. 1 through 5, a collection tray 84 having a handle 84A is positionable within a cavity 86 that extends beneath the liquid outlet surface portions 42 of the lower cooking plate 32 for collecting liquid cooking byproducts dripping off the lower cooking plate 32. The cavity 86 is defined in part by a pair of vertical wall portions 88 spaced apart from one another in a parallel manner and extending in the same direction as the grooves 36. A pair of coplanar, upwardly-facing, tray-supporting slide members 90 project toward one another from respective ones of the vertical wall portions 88 for slidably retaining two lateral side flanges 92 formed on the sides of the collection tray 84. Bosses 92A on the bottom leading ends of the side flanges 92 slide over the top surfaces of the slide members 90 so that one may easily slide the collection tray 84 into the cavity 86 from the right side of the appliance 20 in position to collect liquid cooking byproducts during cooking operations, and slide the collection tray 84 out of the cavity 86 to empty and clean the tray 84. Slide members 90 have depending stop plates 90A at their outermost ends. The stop plates 90A are engaged by stop members 93 formed on the sides of the tray 84 to prevent the tray 84 from being inserted too far into the cavity 86.

Because the collection tray 84 is mountable from a side of the lower cooking unit 22, the front of the appliance 20 can be used as a control panel for a timer 94 and a "power on" signal light 96 so that the timer 94 and the light 96 are conveniently accessible and visible. The "power on" light is connected in the electric circuit for energizing the heating elements (not shown) for each cooking plate 32 and 50. The two heating elements are connected by a wrapped power cord 98, as is conventional in contact grills.

The usages of the cooking appliance 20 of this invention are believed obvious in view of the foregoing description and the drawings. When the appliance 20 is organized as shown in FIG. 1, liquid cooking byproducts will tend to flow under the influence of gravity into the collection tray 84. If the appliance 20 is organized as shown in FIG. 3 to provide a type of double griddle, the collection tray 84 is useful for collecting liquid cooking byproducts from the lower cooking plate 32. However, cooking byproducts entering the grooves 54 in the upper cooking plate 50 will accumulate at the right side of its grooves 54.

As shown in the drawings, the cooking units 22 and 24 are both substantially rectangular, each having longer front and back edges parallel to the hinge 64 connecting them, and shorter side edges spanning between the opposite ends of the front and back edges. Accordingly, the overall depth of the appliance 20, when the upper cooking unit 24 is beside the lower cooking unit 22 as shown in FIG. 3, is kept to a minimum for the total cooking area made available in this configuration.

One may note that the lower cooking unit 22 could be used by itself, whether or not the upper cooking unit 24 is connected to the lower cooking unit 24. That is, the lower cooking unit 22 could itself form a complete appliance.

Although the presently preferred embodiments of this invention have been described, it will be understood that within the purview of the invention various changes may be made within the scope of the following claims.

Having thus described my invention, I claim:

1. A convertible household electric cooking appliance comprising:

a lower cooking unit;

an upper cooking unit pivotally mounted on said lower cooking unit for rotation about a horizontal axis to three different positions, a first position in which said upper cooking unit is on top of said lower cooking unit, a second position in which said upper cooking unit is substantially horizontally oriented with and parallel to said lower cooking unit; and a third, generally upright, position intermediate said first position and said second position;

said lower cooking unit comprising:

a support;

a lower cooking plate horizontally mounted on said support, said lower cooking plate having an upwardly-facing, upper surface comprising plural, mutually parallel and coplanar cooking surfaces separated from one another by plural, mutually-parallel arcuate grooves that increase in depth from one margin of said lower grill plate toward the opposite margin of said lower grill plate, and liquid outlet surface portions adjacent said opposite margin that permit liquid cooking byproducts moving down said grooves to drip downwardly off said upper surface;

said upper cooking unit comprising:

an upper cooking plate that forms a cooking chamber with said lower cooking plate when said upper cooking unit is in said first position, and which has a cooking surface that faces downwardly when said upper cooking unit is in said first position and faces upwardly when said upper cooking unit is in said second position.

2. The cooking appliance of claim 1 wherein said upper cooking unit further comprises a cover for said upper cooking plate and a support leg on said cover adapted to support said upper cooking unit in said second position so that the upper cooking plate is horizontal and substantially coplanar with said lower cooking plate in said second position.

3. The cooking appliance of claim 2 wherein said leg is pivotally mounted on said cover from a position in which it is substantially vertical to support said upper cooking unit in said second position to a position in which it is substantially horizontal and unobtrusive when said upper cooking unit is in said first position.

4. The cooking appliance of claim 1 wherein said grooves and said cooking surfaces are substantially parallel to said pivot axis.

5. The cooking appliance of claim 1 wherein said lower cooking unit support has a cavity beneath said liquid outlet surface portions.

6. The cooking appliance of claim 5 further comprising a collection tray positionable under said liquid outlet surface portions for collecting liquid cooking byproducts dripping off said lower cooking plate.

7. The cooking appliance of claim 6 wherein said collection tray is slidably mounted on said lower cooking unit support.

8. The cooking appliance of claim 7 wherein said cavity in said support is defined in part by a pair of vertical wall portions spaced apart from one another in a parallel manner and extending in the same direction as said grooves, wherein said support has a pair of coplanar, upwardly-facing tray-supporting surfaces projecting toward one another from respective ones of said vertical wall portions, and wherein said collection tray has two lateral side flanges slidably retained on said upwardly-facing tray supporting surfaces to slidably and removably retain said collection tray in such a manner that liquid cooking byproducts dripping down from said lower cooking plate can be accumulated in said collection tray.

9. The cooking appliance of claim 1 wherein said upper cooking unit is pivotally mounted on said lower cooking unit by a hinge formed by cooperating portions of said lower cooking plate and said upper cooking plate.

10. The cooking appliance of claim 1 wherein both said upper cooking unit and said lower cooking unit are generally rectangular in plan and have longer sides parallel to said pivot axis and shorter sides spanning the ends of said longer sides.

11. A cooking unit comprising:
a support;
a cooking plate horizontally mounted on said support,
said cooking plate having an upwardly-facing, upper surface comprising plural, mutually parallel and coplanar cooking surfaces separated from one another by plural, mutually-parallel arcuate grooves that increase in depth from one margin of said lower grill plate toward the opposite margin of said lower grill plate, and liquid outlet surface portions adjacent said opposite margin that permit liquid cooking byproducts flowing down said grooves to flow downwardly off said upper surface.

12. The cooking unit of claim 11 wherein said support has a cavity beneath said liquid outlet surface portions.

13. The cooking unit of claim 12 further comprising a collection tray positionable beneath said liquid outlet surface portions for collecting liquid cooking byproducts flowing off said lower cooking plate.

14. The cooking appliance of claim 13 wherein said collection tray is slidably mounted on said support.

15. The cooking appliance of claim 14 wherein said cavity in said support is defined in part by a pair of vertical wall portions spaced apart from one another in a parallel manner and extending in the same direction as said grooves, wherein said support has a pair of coplanar, upwardly-facing tray-supporting surfaces projecting toward one another from respective ones of said vertical wall portions, and wherein said collection tray has lateral side flanges slidably retained on said upwardly-facing tray supporting surfaces to slidably and removably retain said collection tray in such a manner that liquid cooking byproducts dripping down from said lower cooking plate can be accumulated in said collection tray.

16. A household electric cooking appliance comprising:
a lower cooking unit;
an upper cooking unit pivotally mounted on said lower cooking unit for rotation about a horizontal axis from one position in which said upper cooking unit is on top of said lower cooking unit to another position in which said upper cooking unit is generally upright;
said lower cooking unit comprising:
a support;
a lower cooking plate horizontally mounted on said support,
said lower cooking plate having upwardly-facing, food-supporting surfaces separated by downwardly-sloping surfaces extending generally from one margin of the cooking plate to the opposite margin for directing liquid cooking byproducts away from food being cooked on said food-supporting surface;
said lower cooking plate having liquid outlet surface portions at the lower end of said downwardly-sloping surfaces;
said lower cooking unit having a cavity beneath said liquid outlet surface portions; and
a collection tray removably mounted in said lower cooking unit so that liquid cooking byproducts flowing down said sloping surfaces flow along said liquid outlet surfaces and into said tray.

17. The cooking appliance of claim 16 wherein said cavity is defined in part by a pair of vertical wall portions spaced apart from one another in a parallel manner and extending in the direction from said one margin to said opposite margin, wherein said support has a pair of coplanar, upwardly-facing tray-supporting surfaces projecting toward one another from respective ones of said vertical wall portions, and wherein said collection tray has lateral side flanges slidably retained on said upwardly-facing tray supporting surfaces to slidably and removably retain said collection tray in such a manner that liquid cooking byproducts dripping down from said lower cooking plate can be accumulated in said collection tray.

* * * * *